Feb. 3, 1970 TADAO NAKAMURA ET AL 3,492,718

METHOD FOR PREPARING INFRARED QUENCHING PHOTOCONDUCTIVE MATERIAL

Filed July 19, 1967

INVENTORS
TADAO NAKAMURA,
TADAO KOHASHI

BY Stevens, Davis, Miller & Mosher

ATTORNEYS

United States Patent Office 3,492,718
Patented Feb. 3, 1970

3,492,718
METHOD FOR PREPARING INFRARED QUENCHING PHOTOCONDUCTIVE MATERIAL

Tadao Nakamura, Kawasaki-shi, and Tadao Kohashi, Yokohama, Japan, assignors to Matsushita Electric Industrial Co., Ltd., Osaka, Japan, a corporation of Japan Filed July 19, 1967, Ser. No. 654,548
Claims priority, application Japan, Aug. 15, 1966, 41/54,082
Int. Cl. B01j *17/00;* B22f *3/24;* H01g *9/00*
U.S. Cl. 29—572 5 Claims

ABSTRACT OF THE DISCLOSURE

An infrared quenching photoconductive material of this invention has advantages over the conventional CdS material as follows:

(1) efficiency of infrared quenching is increased.
(2) wavelength sensitivity is improved on the side of longer wavelengths.
(3) time response is shortened.

The material is composed of CdS·Se as a base. It can be utilized in solid-state infrared image transducers of various kinds, photoelectric transducer, photoelectric relay and photoelectric switch employing infrared rays.

The present invention relates to an infrared quenching photoconductive material. The object of the invention is to improve (1) quenching efficiency, (2) wavelength sensitivity and (3) time response of a cadmium sulfide material which has been conventionally employed by means of forming a solid solution of cadmium sulfide and carmium selenide.

In a cadmium sulfide, cadmium sulfoselenide and cadmium selenide (hereinafter referred to as CdS, CdS–Se and CdSe, respectively) photoconductive body, a photocurrent which is excited by rays of which wavelengths are in a certain range is decreased by an overlapped irradiation of infrared rays. Such a phenomenon, called "optical quenching" or "infrared quenching," has been known in an experiment on single crystal.

The infrared rays employed in this case are socalled "near infrared rays," and 0.8–1.6$\mu$ in wavelengths.

The above CdS, CdS–Se and CdSe infrared quenching photoconductive bodies can be used as a near infrared sensitive material.

The infrared quenching phenomenon has heretofore been observed in a pure CdS single crystal into which no impurity is incorporated or a CdS single crystal to which some impurity has been added. However, a sensitive material having a large ray-receiving area can not be obtained from a single crystal, that is, a large current can not be obtained. From this point of view, a sintered film and powdery infrared quenching material which are capable of providing a large area and not subjected to limitation in shape are desired. The solid-state infrared image transducer is an example of utilization of the above sintered film or powdery infrared quenching material. The solid-state infrared image transducer is an apparatus wherein an infrared quenching photoconductive layer and an electric luminous layer are combined together and a voltage is applied across them, and a luminescence of electric luminous layer is controlled by an impedance change of infrared quenching photoconductive layer caused by an irradiation of infrared image, the irradiated infrared image being transduced or amplified to a negative or positive visible image onto the electric luminous layer. It is desired that an infrared quenching photoconductive material which is employed in an apparatus of this kind has a large photo-current decrease by the irradiation of infrared ray, i.e. a superior sensitivity for infrared rays.

However, the CdS which has generally been used as a photoconductive material has a poor infrared quenching characteristics, especially CdSe material does not show any infrared quenching characteristics at room temperature. As a matter of fact, these are difficult to use as an infrared sensitive material using infrared quenching.

The present invention is intended to provide an infrared quenching photoconductive material using as a base a solid solution of CdS and CdSe, which material can be satisfactorily employed with the above solid-state infrared image transducer and other infrared sensitive devices. According to this invention, there is provided an infrared photoconductive material which is superior to the conventional one with respect to the following points.

(1) Efficiency of infrared quenching (percent quenching, hereinafter described) is high.

(2) Wavelength sensitivity extends on a side of longer wavelengths.

(3) Time response is rapid.

The term "percent quenching" is generally employed to show a degree of infrared quenching. The percent quenching is defined as follows:

$$Q=\frac{\Delta I}{I_B-I_D}\times 100\%$$

where Q represents an amount of percent quenching (%), $I_B$ represents a photo-current, $I_D$ represents a dark current and $\Delta I$ represents a decrement according to an infrared irradiation. The above photocurrent $I_B$ may also be called "bias photocurrent" and a light having a wavelength band which is at least overlapping partly on spectral sensitivity of photoconductive material is usually employed, this light is referred to as a bias light. For example, in case of pure CdS single crystal having a narrow spectral sensitivity, the green bias light is employed.

Although the accurate model of infrared quenching phenomenon has not been established yet, it may be explained as follows:

When the bias light is irradiated on such a material as CdS, electrons and holes are formed. The electrons lie in a conduction band to contribute to the conductivity. On the other hand, the holes occupy certain defect levels or impurity levels in a forbidden band. When an equilibrium state is set up, the holes which have been trapped by the defect centers or impurity centers serve to prolong a lifetime of electrons, a charge carrier. Thus this process has a sensitization action. When the infrared irradiation is overlapped on the bias light, the holes trapped by the defect centers or impurity centers are excited to the filled band. As a result, the above sensitization action decreases, and the lifetime of electrons is shortened by the increased probability of recombination with the excited holes, and thereby the decrease of conductivity, the infrared quenching phenomenon, occurs. The origin of the defect levels or impurity levels which play an important role in the infrared quenching remains unclear. However, it is presumed that it may be an acceptor level which comprises a structural defect of a certain kind.

The powdery infrared quenching photoconductive material of the present invention can be prepared in a manner described below.

It is, however, a mere embodiment of the process for preparation and should not be intended for limiting the present invention.

100 grams of a mixture of CdS and CdSe or a solid solution of CdS-CdSe is dispersed in 150 cc. of water. A solution of copper chloride is added to the mixture, mixed thoroughly and then dried in a recycled atmosphere at 150° C. for 17 hours. This dried body is crushed into small particles and sintered in an oxygen-containing atmosphere, such as air, for 40 minutes at 600° C. The sintered material is immersed into water and pulverized into fine powder. After washing with water thoroughly, the pulverized portion is immersed in a mixed solution of 0.2 molar solution of cadmium chloride and 1 molar solution of ammonium chloride and an excess of the solution is filtered off, and the remaining portion is dried. This dried material is sieved to remove the powder of larger size and again fired in the same atmosphere, time and temperature as mentioned above. The fired material is sieved to remove larger particles, and fired in a sulfur-containing inert gas for 15 minutes at 500° C., followed by subsequent firing in vacuum for 15 minutes at 500° C.

After cooling, the fired material is sieved to remove larger particles, thereby to obtain a final product which is a photoconductive body having a high efficiency of infrared quenching.

The amount of activator to be added, for example, an element of Group I–B of Periodic Table such as copper, is desirably about $4\times10^{-4}$–$1\times10^{-3}$ mols per mol of the parent body. A monovalent metal such as silver and the like may be employed instead of copper. The material obtained finally is a powdery material which is photoconductive, having a high efficiency of infrared quenching. It has a high dark resistance and good sensitivity.

This invention is further described with reference to one embodiment thereof together with the attached drawings in which.

EXAMPLE

Figure 1:
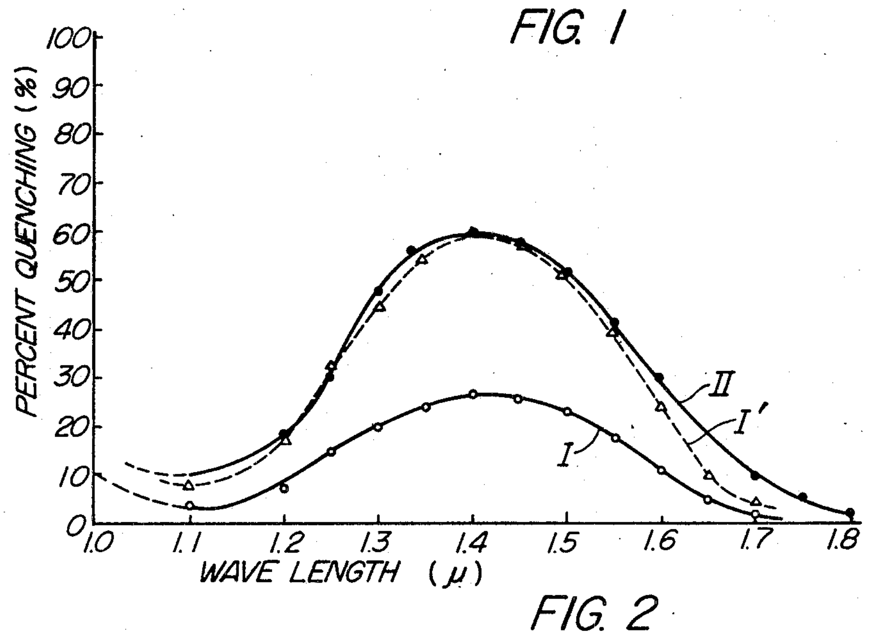
FIG. 1 is a graph illustrating the infrared quenching amount as a function of the wavelengths of the infrared rays for CdS and CdS-Se.

A standard cell is employed in the measurement of the properties of an infrared quenching photoconductive body in powder form. The body has been bound with ethylcellulose on a glass plate providing a 7 mm.×0.7 mm. electrode of vacuum evaporated gold. A D.C. voltage of 400 v. is applied on the cell. In FIG. 1, the amounts of percent quenching of the conventional CdS photoconductive body and the CdS-Se of the present invention are plotted as the functions of wavelengths of infrared rays irradiated. Curves I and II corresponds respectively to the conventional CdS photoconductive body and to the CdS-Se photoconductive body of the present invention comprising a mixture of equal amounts of CdS and CdSe.

In this example, a usual incandescent bulb is used which is provided with a filter which intercepts rays of wavelengths longer than 0.7$\mu$ in order to obtain the bias light. A luminescence of incandescent bulb having a color temperature of 2850° K. is monochromated through a monochromator and used as a source of infrared rays.

The curves in the figure are not calibrated with regard to the distribution of emission energy. It is known that dependence of percent quenching upon irradiated infrared wavelengths usually has peaks near 1.4$\mu$ and 0.9$\mu$ and that the position of peak at 0.9$\mu$ varies with the material, since it is affected by the spectral photoconductivity characteristics of the material on the side of longer wavelengths.

It is presumed that since the material in this example is panchromatic, the peak at 0.9$\mu$ is hidden behind the photoconductivity of longer wavelength side and thus cannot be found. Only the peak at 1.4$\mu$ appears.

From the figure, it can be seen that the CdS-Se material of the present invention has an excellent quenching characteristics as compared with the conventional CdS material and thus it can be employed as an infrared sensitive material having a sensitivity as far as about 1.7$\mu$ of infrared rays.

Curve I' is obtained by normalizing Curve I of the conventional material with Curve II of the present material at the maximum point. Therefore the scale of ordinate is arbitrary. As is obvious therefrom the relative value as well as the absolute value of sensitivity of the present material are improved on the side of longer wavelengths.

Figure 2:
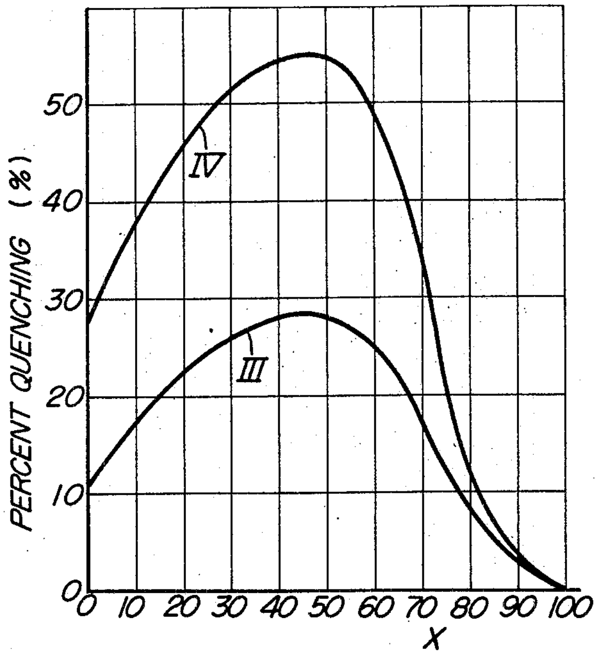
FIG. 2 is also a graph illustrating the infrared quenching amount of powdery CdS–Se material as a function of CdS proportion in percent for different bias photocurrent.

FIGURE 2 shows percent quenchings of CdS-Se material as functions of mixing proportion of CdSe to CdS materials at room temperature for different bias photocurrents.

X shown on the abscissa is the mixing proportion of CdSe to CdS in weight percent. Accordingly, for example, when X=0, it corresponds to CdS per se, when X=50, it corresponds to CdS-Se having 50% of CdSe, and when X=100, it corresponds to CdSe per se.

The infrared rays employed are monochromatic light having 1.4$\mu$ of wavelength and the intensity of 250 $\mu$w./cm.$^2$. The Curves III and IV show the relation between the percent quenchings and the mixing proportions in case that the bias photocurrents are 100 $\mu$a. and 10 $\mu$a. respectively.

It can be seen that the CdS-Se infrared quenching photoconductive material of the present invention has better infrared quenching characteristics at least in a range of $x\leq80$ as compared with the conventional CdS or CdSe material.

Other features of the infrared quenching material of the present invention are that the time constants of both building-up time of quenching at the time when infrared rays are irradiated and decay time of quenching at the time when infrared rays are removed are small. This feature is important as an infrared sensitive material. For example, in case that it is employed as an infrared image transducer, a converted visible image is shown with a short response time to an infrared irradiation of image, and the retaining of the converted image disappears rapidly when the infrared image is removed.

In Table I, the response time constants of CdS-Se materials of the present invention having respectively 20% and 50% of CdSe are shown as compared with that of the conventional CdS material. $\tau_R$ represents the building-up time constant ($1/e$) when infrared rays are irradiated and $\tau_D$ represents the decay time constant ($1/e$) when infrared rays are removed. The bias photo-current is constant. With CdS-Se material of the present invention, the more the amount of CdSe, the shorter the infrared quenching response time.

TABLE I

| | CdS | $CdS_{80}$-$Se_{20}$ | $CdS_{50}$-$Se_{50}$ |
|---|---|---|---|
| $\tau_R$ (sec.) | 2.5 | 1.2 | 0.7 |
| $\tau_D$ (sec.) | 14 | 2.5 | 1.3 |

The suffixes of CdS-Se represent weight percents of components thereof. The bias photo-currents are 30 $\mu$a. constant, in all cases.

The above table shows that the infrared quenching response characteristics of CdS-Se is extremely excellent as compared with that of CdS.

The present invention has been explained with particular reference to the powdery material but it is to be understood that the sintered film layer also gives a similar excellent result.

As mentioned above, the CdS-Se-base material of the present invention has excellent infrared quenching characteristics and infrared quenching response characteristics as compared with the conventional CdS- or CdSe-base material and finds wide application as an infrared response material to be used for an infrared photoelectric transducer, in the field of solid-state image transducer photoelectric relay, and photoelectric switch of various kinds, etc.

We claim:

1. A method for preparing an infrared quenching photoconductive material from a solid solution of cadmium sulfide and cadmium selenide, and comprising the steps of: firing said solid solution in the presence of an element selected from the group consisting of copper and silver in an oxygen-containing atmosphere at a temperature near 600° C. and for approximately 40 minutes to sinter said solid solution with said element; pulverizing the sintered material into fine particles; refiring said fine particles in an oxygen-containing atmosphere at a temperature near 600° C. and for approximately 40 minutes for growing the microcrystals thereof; and further refiring the refined material in a sulfur-containing atmosphere at a temperature near 500° C. and for approximately 15 minutes to treat the surfaces of the microcrystals.

2. A method according to claim 1, wherein the amount of said element is between $4\times10^{-4}$ and $1\times10^{-3}$ molecules per molecule of said solid solution.

3. A method according to claim 1, wherein said disintegrated material is immersed in a solution of 0.2 mol of cadmium chloride and 1.0 mol of ammonium chloride before it is refired.

4. A method according to claim 1, wherein said solid solution comprises cadmium sulfide and cadmium selenide according to $CdS_{1-x}Se_x$, where $0<x\leq0.8$.

5. A method for preparing an infrared quenching photoconductive material of a solid solution of cadmium sulfide and cadmium selenide, and comprising the steps of: adding to said solid solution an element selected from the group consisting of copper and silver, said element being of between $4\times10^{-4}$ and $1\times10^{-3}$ molar concentration and provided in the form of a salt; heating the resultant mixture of said solid solution and said element; crushing the heated mixture into fine particles; sintering said fine particles in an oxygen-containing atmosphere at a temperature near 600° C. and for approximately 40 minutes; pulverizing the sintered material into fine particles; washing said particles in water; immersing the washed powder in a mixed solution of 0.2 mol of cadmium chloride and 1.0 mol of ammonium chloride; filtering off the excess portion of said mixed solution; drying the remaining mixture of said powder and mixed solution; sieving said mixture for removing large-sized grains therefrom; firing the sieved material in an oxygen-containing atmosphere at a temperature near 600° C. and for approximately 40 minutes; further sieving the fired material for removing large-sized grains therein; and refiring the sieved material in a sulfur-containing inert gas at a temperature near 500° C. and for approximately 15 minutes, and further in a vacuum at a temperature near 500° C. and for approximately 15 minutes.

References Cited

UNITED STATES PATENTS

| | | | |
|---|---|---|---|
| 2,876,202 | 3/1959 | Busanovich et al. | 252—501 |
| 2,879,182 | 3/1959 | Pakswer et al. | 252—501 X |
| 2,916,678 | 12/1959 | Bube et al. | 252—501 X |
| 2,958,932 | 11/1960 | Goeroke | 252—501 X |
| 3,208,022 | 9/1965 | Sihvonen et al. | 252—501 X |

OTHER REFERENCES

Sumitada: Chem. Abstracts, 55, 14075, from J. Phys. Soc. Japan 15, 2103 (1960).

Pivtoradni and Fedorns: Chem. Abstracts, 54, 23792e, from Fotoelek i Opt. Yavleniya v Poluprovodn., Trudy I-go (Pervogo) Vsesoyuz, Soveshehaniya, Kiev 1957.

ARCHIE R. BORCHELT, Primary Examiner

C. M. LEEDOM, Assistant Examiner

U.S. Cl. X.R.

29—420.5; 250—211; 258—83.3